United States Patent [19]

Burdoin et al.

[11] Patent Number: 5,521,817
[45] Date of Patent: May 28, 1996

[54] AIRBORNE DRONE FORMATION CONTROL SYSTEM

[75] Inventors: Robert B. Burdoin, Salt Lake City, Utah; Nicolaas J. Moolenijzer, Sandia Park; Fred M. Strohacker, Albuquerque, both of N.M.

[73] Assignee: Honeywell Inc., Minneapolis, Minn.

[21] Appl. No.: 287,993

[22] Filed: Aug. 8, 1994

[51] Int. Cl.$^6$ .......................... G06F 165/00; B64C 13/20
[52] U.S. Cl. .......................... 364/423; 364/432; 244/3.14; 244/190
[58] Field of Search .................... 364/423, 434, 364/432, 439; 244/189, 190, 3.11, 3.14

[56] References Cited

U.S. PATENT DOCUMENTS

| | | | |
|---|---|---|---|
| 3,573,818 | 4/1971 | Lennon, Jr. et al. | 343/6.5 |
| 3,778,835 | 12/1973 | Scharf | 343/113 R |
| 4,405,943 | 9/1983 | Kanaly | 358/133 |
| 4,674,710 | 6/1987 | Rodriguez | 244/76 R |
| 5,240,207 | 8/1993 | Eiband et al. | 244/190 |
| 5,308,022 | 5/1994 | Cronkhite et al. | 244/3.14 |
| 5,353,303 | 10/1994 | Walthall | 375/1 |

*Primary Examiner*—Michael Zanelli
*Attorney, Agent, or Firm*—Kenneth J. Johnson; Donald J. Lenkszus

[57] ABSTRACT

In a method and apparatus for remotely controlling a formation of drones. A single drone is chosen as a formation leader. Each other drone in the formation has one other drone in the formation as its leader. A follower drone will sense relative movement parameters as well as inquire of its leader drone as to its other movement parameters. The follower drone will then control itself to follow the movements of its leader.

7 Claims, 9 Drawing Sheets

FORMATION CONTROL

NAVIGATION PREDICTION
    GUIDANCE CONTROL LAWS
    AFCC MODE CONTROL & SEQUENCING

MODE LOGIC

LOSS OF CARRIER HANDLING
    LOSS OF MASTER HANDLING
    CAPTURE SCENARIO
    BREAK-OFF SCENARIO

RANGE RATE CALC & RANGE SMOOTHING

BEARING CALC & SMOOTHING

I/O HANDLING

RF
    SPVI
    AFCC

RESET/POWER-UP

BIT

AIRBORNE DRONE FORMATION CONTROL SYSTEM

BACKGROUND OF THE INVENTION

TECHNICAL FIELD

This invention pertains to remotely controlled unmanned drones.

Remotely controlled airborne unmanned drones are used for many purposes, including the testing and evaluation of weapons systems by various armed services. In particular, the military has found target drone formation flying to be significant in the evaluation of weapon systems. Certain control drone formation flying arrangements presently available utilize ground station computer control to maintain each aircraft's position in four dimensional space (XYZT). In the simplest example, with two airplanes flying in drone formation, the ground station would multilaterate or use triangulation to determine the position of each individual aircraft. The ground station independently triangulates the position of each aircraft. The disadvantage of this approach is that it takes a significant development to provide software in the ground stations for every new aircraft type that is to be adapted to this system. Accordingly, a system of this type is very expensive to develop and maintain. Perhaps more significantly, systems of this type are most appropriate for controlling complex drone formations flying on a grid system based range. A further disadvantage of this prior arrangement is it is not effective when flying the drone formation outside the range of triangulation stations that is necessary for the prior arrangement. This presents a clear disadvantage for flying drone formations over the oceans. It is even more difficult where the drone formations are over the horizon from the ground control stations.

In an attempt to avoid some problems, it is common to utilize "high flyer" aircraft as control stations. Or alternatively, to utilize shipboard platforms. Adding even additional complexity is the utilization of both high flying aircraft and shipboard stations for providing formation control.

A drone range tracking system is the means by which drones are tracked while traversing a range. It provides positional information to a drone controller. Two types of drone range tracking systems are currently in use; grid range and rho-theta. In grid range system, the range is grid mapped. Ground relay stations are placed at surveyed points on the grid. Then drone command/telemetry time of arrival and trilaterization are used to fix a drone's position in x, y, z coordinates.

A rho-theta system consists of a tracking radar that returns range (rho), azimuth (theta), and elevation from the surveyed radar station to the drone. The majority of drone ranges are solely dependent upon rho-theta tracking systems for positional data. Rho-theta systems cannot provide the accuracy to control multiple drones in close formation, since rho-theta errors are typically 190 ft. RMS in range and, at distances of 100 nautical miles, 600 ft. RMS in azimuth and 1,200 ft. RMS in elevation.

Several command/telemetry systems are used at the different ranges. These systems dictate the form and characteristics of the uplink commands for controlling the airborne drones and the downlink telemetry of drone parameters for ground station monitoring.

In a proposed next generation arrangement which is to permit flight of drones in formation and, in particular, is also directed toward providing over-the-horizon control capability, each drone will have a global positioning system (GPS) receiver. The GPS position from each drone is downlinked to a ground station or to a high flying aircraft. The GPS position is received and is used to control the flight of the drones to prevent collision. A disadvantage again of this type of arrangement is that the ground station will require a significant amount of software along with the expense of developing such software. The one advantage of the GPS approach is that no longer will it be required to multilaterate.

It is desirable to provide a drone formation control system which would be more independent of ground stations, and be independent of command/telemetry system types and aircraft types. It is further desirable to provide an automatic drone formation control system which is independent of the particular drone range.

SUMMARY OF THE INVENTION

In accordance with the principles of the invention, an autonomous airborne drone formation control system is provided which is not dependent upon the type of ground based control of the formation and which thereby permits operation at ranges having different equipment capabilities. A system in accordance with the invention has inter-range operability independent of the drone command and control ground stations.

Further, a control system in accordance with the invention permits formation flying of different types of aircraft without requiring separate modeling of each type of aircraft. In a system in accordance with the principles of the invention, a single lead aircraft in the formation is under positive ground control. All other aircraft in the formation are programmed to follow at relative range, bearing and altitude positions to their individual lead drone. The formation lead aircraft may be flown under direct ground control or is commanded to preprogrammed way points which can be modified in mission. All aircraft in the formation include escape profiles/maneuvers as a function of their formation position.

BRIEF DESCRIPTION OF THE DRAWINGS

The invention will be better understood from a reading of the following detailed description in conjunction with the drawing in which.

DETAILED DESCRIPTION OF THE DRAWINGS

1. Functional Overview

Figure 1:
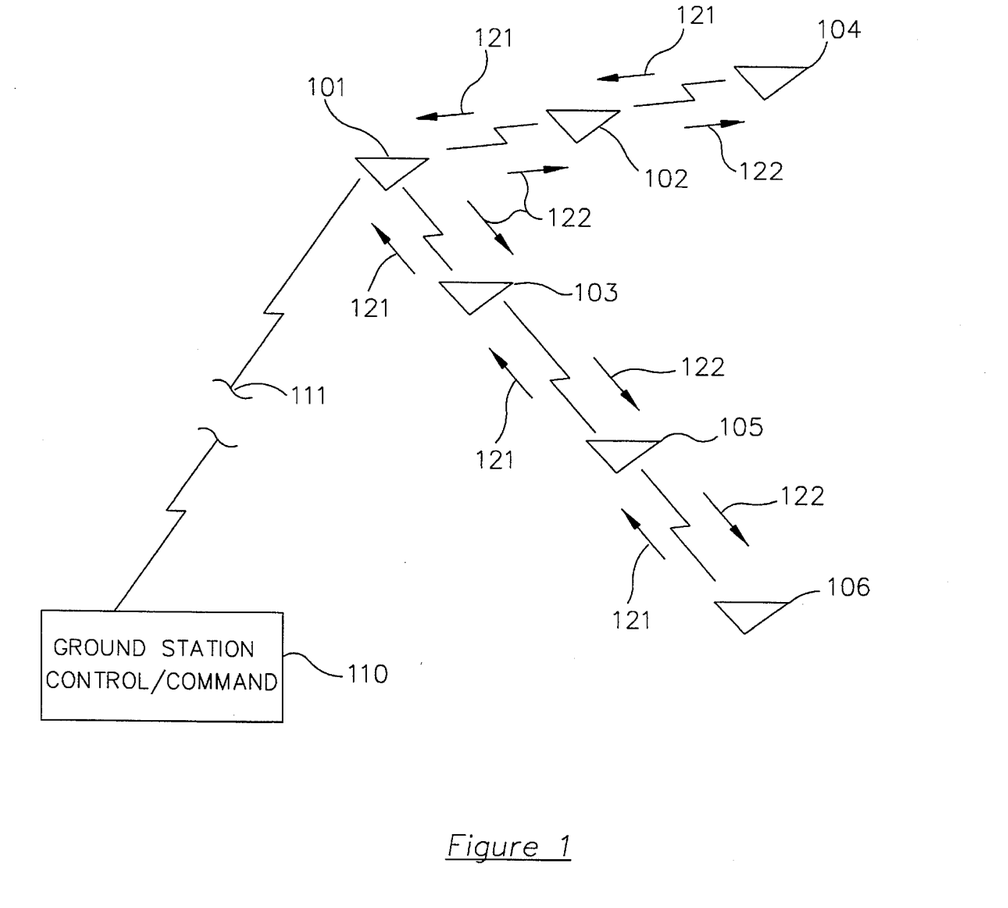
FIG. 1 illustrates an airborne drone formation operating in accordance with the invention.

FIG. 1 illustrates a plurality of drones flying in formation in accordance with the functional operation of the invention. One drone is flown on the mission flight path by a command and control ground station while the remaining drones follow that lead by in turn tracking each other in a leader/follower configuration. In an echelon formation, depicted in FIG. 1, the lead drone 101 is the leader for the two nearest trailing drones 102, 103. These two drones 102, 103 are in turn leaders for the drones 104, 105 trailing them, and so on for the rest of the drones 106 in the formation.

The initiation of automatic formation flight and the formation parameters are controlled via uplink commands transmitted from a command/control system 110. Proportional uplinks for range, bearing, and altitude displacement can be used to define the separation requirements while discrete uplinks are used for enabling the Airborne Drone Formation Control System (ADFCS) to take control of the drone. Appropriate downlink telemetry is supplied by each ADFCS for ground control monitoring.

During formation flight, the ADFCS on each drone uses an inter-drone communications and measurement system and the command and control system to develop guidance parameters for controlling the drone's flight profile.

The formation is maintained by each leader/follower drone pair communicating useful data such as altitude, heading, airspeed, body axis rates, accelerations, etc., and by performing range and bearing measurements so that the follower drone ADFCS guidance control laws can derive flight control commands (pitch and roll attitude, throttle, etc.) to maintain a defined position with reference to its leader.

There are four principle operational modes: prelaunch, launch and capture, in-flight, and recovery of each drone.

As part of the prelaunch configuration, each drone or ADFCS is assigned its own unique address (identification number) and fixed time delays for response to Loss of Carrier (LOC) and Loss of Master (LOM) conditions selectable via hardwired switches on the faceplate or non-volatile memory of each ADFCS unit. Additionally, each ADFCS has loaded into its non-volatile memory the address of each drone to be flown in formation, organized so as to delineate each drone's position in the formation.

The LOC and LOM time delays instruct a drone how long it should wait before taking alternative action if it continuously detects an LOC or LOM condition.

The address and positional information is necessary so that each drone knows which drone is its leader and what address to use for inter-drone communication. Additionally, if a drone cannot get a response from its leader, i.e., LOM, after initial acquisition and capture, the drone can then decide which other drone is to be its new leader or if it is to become the formation leader drone.

Many scenarios can be devised for launching, capturing, and recovering the drones. Launch is the procedure for getting a drone airborne, while capture refers to a drone's automatic procedure for getting itself into the prescribed formation position aligned with its leader. Recovery procedures are how the drones disengage from the formation and are safely landed at the end of the flight mission. The methods used for launch, capture positioning, and recovery are dependent upon the configuration of the ground station 110.

The configuration of the command/control ground station 110 may vary. Ground station control is provided by manually operated control consoles and/or pre-programmed computers. For ranges near populated areas, computer control and/or multiple manned controllers may be required for controlling each individual drone as a back-up for system failures. At ranges where immediate control of errant drones is not a safety factor, a single multiplexed manned control station may be adequate.

In a minimal command/control system, one multiplexed control station 110 can launch multiple drones into a formation flight. By "multiplexed" it is meant that the control station 110 sequentially provides uplinks and receives downlinks from all drones to be flown in the mission, while providing controller inputs for command uplinks to a single controller selected drone. First, the controller 110 selects and launches the leader drone 101 and places it in a hold pattern (orbit mode). The controller 110 then selects and launches each successive drone in the appropriate leader/follower order, commands their formation mode, and, after verification of capture, enables automatic ADFCS controlled formation flight. When all drones for the formation flight are flying in formation in the hold pattern, the controller 110 again takes control of the leader drone 101 and flies the formation mission.

In another configuration, each drone to be flown is controlled by a dedicated ground controller. Each drone is launched individually with formation capture taking place on the range under the control of each controller in an orderly manner. Independent of the command/control configuration, in flight, each drone maintains its relative range, bearing, and altitude aligned with its leader as commanded in its uplink. If a drone detects an LOM or LOC condition, it will break off from the formation in a defined break-off maneuver for its particular position in the formation. In the case of LOM, the drone will break off and fly in a hold pattern until it reacquires its leader, switches to and acquires a new leader, becomes the formation leader, or is commanded out of formation mode from the ground station. For LOC, the drone will break off and then abort formation control, returning control to the AFCC for AFCC LOC handling.

If a drone has performed a break-off maneuver and then reacquires its leader or acquires a new leader, it shall attempt to capture that leader approaching from the direction most likely to avoid other drones which may still be in formation.

Drone recovery procedures are basically the reverse of the launch procedures. With a single controller, the formation is commanded (via the formation leader) into a hold pattern and then each drone is disengaged from the formation and landed. With multiple controllers, each controller takes control of one drone and lands it.

2. System Architecture

ADFCS architecture includes four areas, an airborne command/telemetry and flight control system integration, a radio frequency (RF) front end for inter-drone data acquisition, an inter-drone communication data link, and software architecture.

Figure 2:
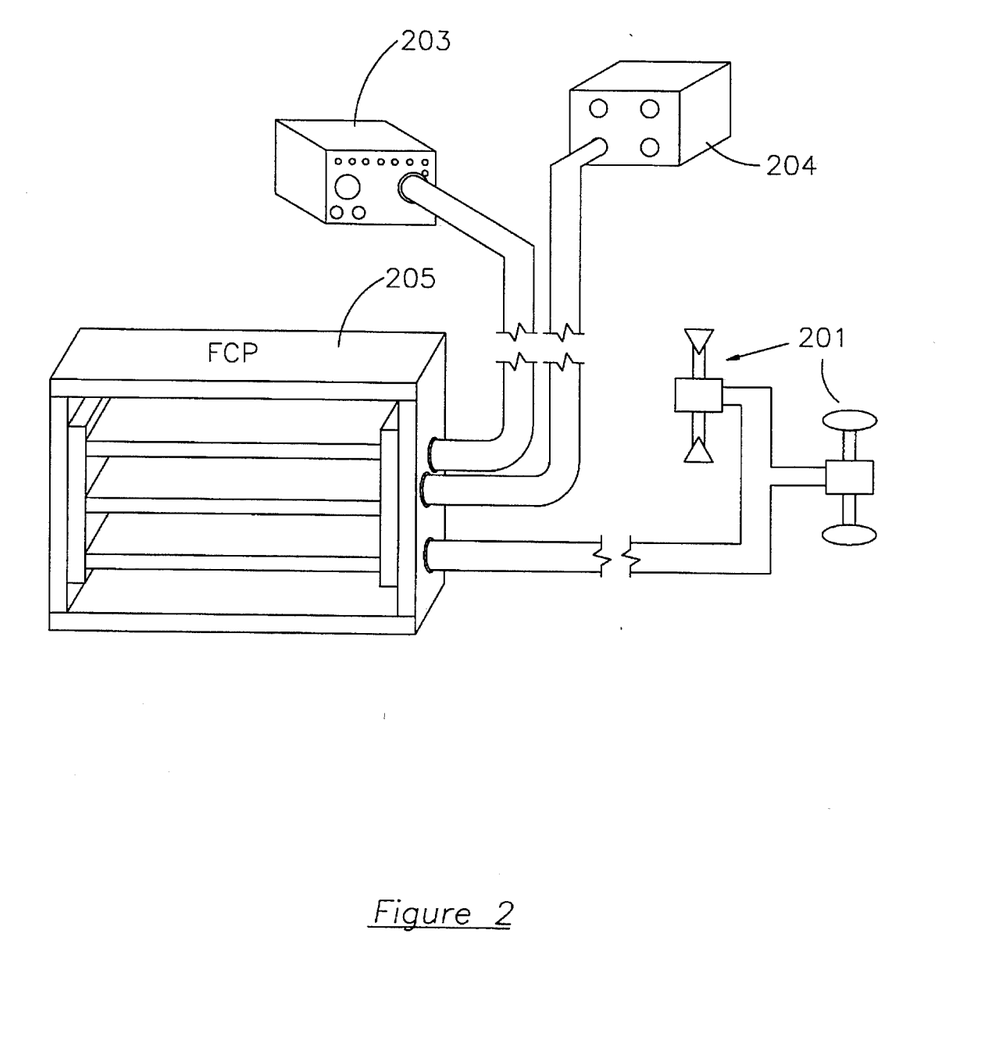
FIG. 2 illustrates the hardware partitioning of an airborne drone formation control system.

The general hardware partitioning of an AFDCS is depicted in FIG. 2. Advantageously, a system in accordance with the invention may be configured to take advantage of existing hardware with which drones are currently equipped. A drone may be equipped with antennas 201 which are coupled to an SPVI 203. In prior configurations, SPVI 203 is coupled to an AFCC 204. Both SPVI 203 and AFCC 204 are commercially available. In the embodiment shown, SPVI 203 is available from Micro Systems and the AFCC 204 is available from Honeywell Inc. An ADFCS in accordance with the invention can be interfaced to the command/telemetry and flight control systems of any drone. In the embodiment shown, the ADFCS is connected to show in particular that it may be used as an "install for use", add-on piece of equipment to an existing system.

In FIG. 2, a formation control processor (FCP) 205 is inserted in the command/telemetry data flow between SPVI 203 and AFCC 204. By positioning the FCP 205 in the data flow in this manner, the ADFCS can monitor the command/telemetry data, and, when commanded into ADFCS formation control, can intercept uplink commands and provide its own flight control commands to AFCC 204 for target formation control as well as provide the drone's formation status in the downlink telemetry. This is the only interfacing required for AFDCS to existing drone systems and advantageously is a single cable in-line connection.

Data is received serially from the SPVI 203 or AFCC 204 by the FCP 205. The FCP 205 monitors for commands to go into formation control and interrupts the flow of data between SPVI 203 and AFCC 204 to control the operation of the drone.

Figure 3:
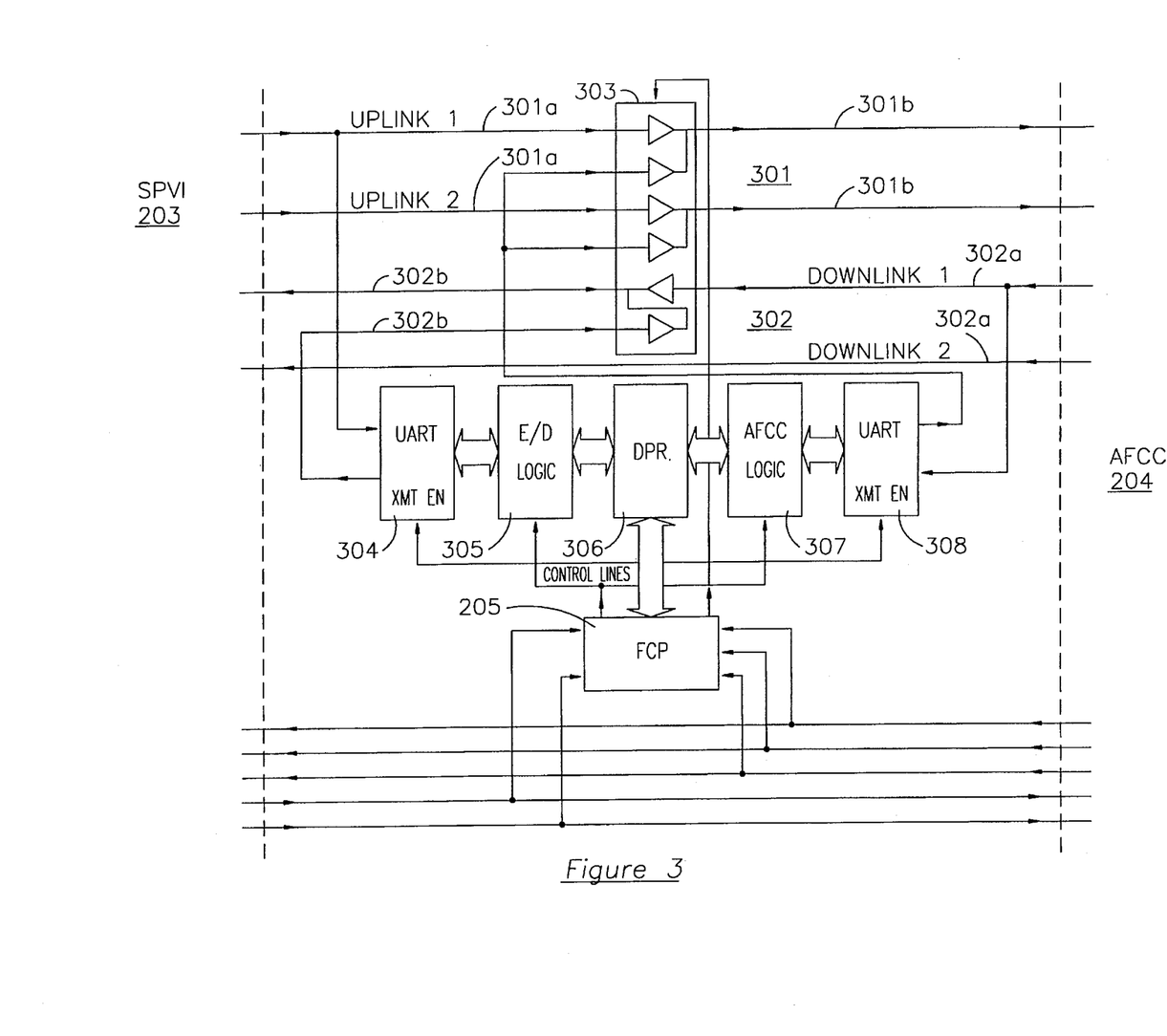
FIG. 3 illustrates in block diagram form the interface of the control processor to an encoder/decoder unit (which may be called a Signal Processor/Vehicle Interface, or SPVI) and a drone flight formation control computer (which may be called an Automatic Flight Control Computer, or AFCC)

Turning now to FIG. 3, the manner in which the FCP 205 is interfaced between SPVI 203 and AFCC 204 is shown in greater detail. Connections to the SPVI 203 are shown on the left side of FIG. 3 and connections to AFCC 204 are shown on the right side. The data links are serial data links with the uplinks 301 and downlinks 302 being coupled to a series of switchable buffers 303. The uplink lines 301 are coupled to a universal asynchronous receiver/transmitter UART 304 which converts the serial data to parallel data and which couples parallel data from the FCP 205 to the downlink lines 302b.

Encoder/decoder logic 305 is coupled to the UART 304 to detect formation control commands received over the uplink lines 301. The formation control processor 205 receives parallel data from the uplink 301 via a dual port random access memory (DPR) 306. DPR 306 is included to provide for the transfer of data. Automatic flight control logic 307 and UART 308 provide for the conversion of parallel data from the FCP 205 to uplink 301b via the buffers 303 and convert serial data received from the AFCC 204 over downlink 302a to parallel data for use by the FCP 205.

Figure 4:
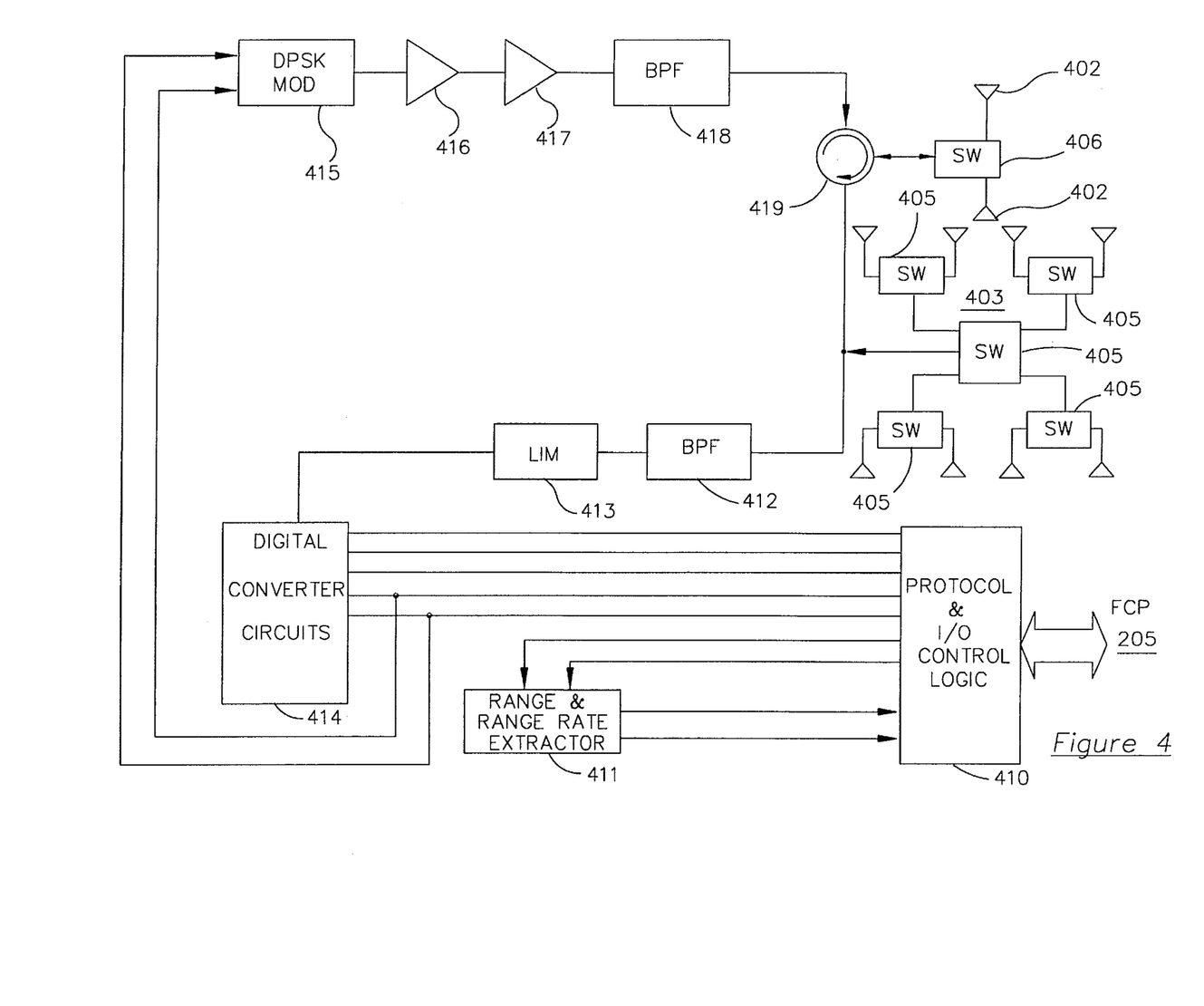
FIG. 4 illustrates in block form the radio frequency portion of the system.

The RF portion 400 of ADFCS shown in FIG. 4 provides the link for the inter-drone communication data link and the means for measuring range and bearing between two drones.

The RF section 400 operates as a transponder for differential phase shift keyed (DPSK) data transmissions, incorporates antenna selection capability and a range and range rate extractor function. ADFCS transmits in an omnidirectional mode and receives in either acquisition mode or track mode (track after initial acquisition is achieved). The track mode allows cycling through the different poles of a directional antenna system 403 so that power measurements can be made and determination of bearing can be calculated. There are both top and bottom pairs of omnidirectional antennas 402 and directional antennas 403 which can be selected for the best communication link depending on the attitude of the drone with reference to its leader. Range calculations are based upon the time delay between when a transmission is initiated and when an appropriate response is received. Range rate is calculated by range differencing. All measurement data will be filtered and smoothed in the formation control processor's software.

Antennas 403 represent directional antennas located on the top and bottom of the front, rear and right and left wings of the aircraft. Switches 405 are coupled to the antenna 403 to provide Conventional directional antenna switching. Antennas 402 function as an omnidirectional acquisition antenna along with switch 406.

The protocol and control logic 410 receives command and data from the FCP 205 and controls operation of the RF portion of the system by turning on and turning off the RF and control of transmitting the data. A range and range rate extractor 411 is a preprocessor for range extraction when performing range extraction. The leader drone is interrogated and a clock is started. When data is received, the clock is stopped and the time is used to calculate the range. This avoids having to perform range calculations in software in the FCP 205. The remainder of the functional blocks in FIG. 4 are of conventional design. Received signals are filtered by bandpass filter 412, passed through limiter 413 and converted into digital format by circuits 414. Digital data signals from the protocol logic 410 are converted to DPSK modulated signals by DPSK modulator 415 fed to driver amplifier 416 which in turn drives power amplifier 417 to bandpass filter 418 and coupled to the selected antenna via circulator 419.

A communication protocol is specifically provided for the inter-drone data link called the Autonomous Dynamically Optimized Periodic Transmission (ADOPT) protocol. This protocol provides autonomous communication with a maximum data throughput at a given minimum data update rate. The basis for ADOPT is to allow each drone in a formation network to achieve their own individual timing window for communications. If an additional drone is introduced into the network or if an existing drone in the network drops out, ADOPT will adjust dynamically to optimize the data update rate. The data update rate is dependent upon the maximum distance requirements for valid communications between drones (i.e. 20 nautical miles), the timing constants used by the protocol for drone differentiation, and the number and length of data messages that make up each interrogate/response data frame.

Figure 5:
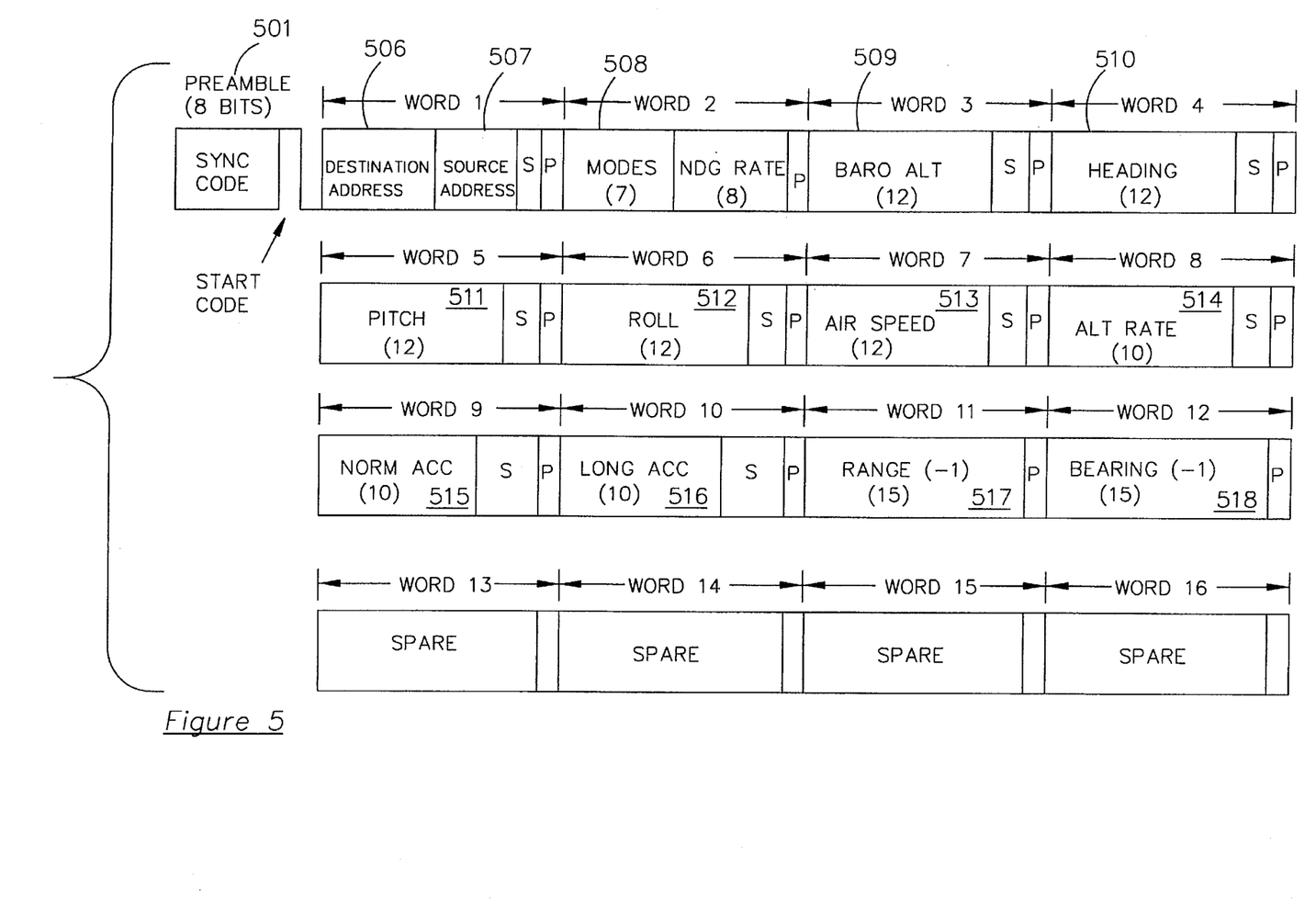
FIG. 5 illustrates the data format.

The data frame developed consists of 3 interrogation/response messages: one message for the drone's interrogation of its leader, one for the leader's response, and one for the drone's response to its leader. The follower drone response to its leader is performed so that the leader can calculate range and bearing for subsequent transmission to the follower for utilization in the following error smoothing on its own range and bearing measurements during the next interrogation/response sequence. As shown in FIG. 5, each interrogation/response message has 256 bits of data (16, 16-bit words) with an 8-bit preamble 501. Conservative analysis with given data frame, message length, and time delay parameters, results in data update rates ranging from 115 data frames per drone per second for a 6-drone formation to 10 data frames per drone per second for a 24-drone formation.

The interrogation/response message content is also shown in FIG. 5. The preamble 501 is used to synchronize the RF demodulator to the detected incoming data so that it can decode the data properly. The destination address 506 identifies the drone for which the message is intended and the source address 507 identifies which drone is transmitting the message. The remaining data are source drone flight parameters for destination drone utilization.

An important message during an interrogation/response cycle is the leader's response to follower's interrogation. Receipt of this message allows the measurement of range and bearing data and provides master flight control data that, together, allows a drone to calculate guidance control to track its leader for maintaining its desired position in the formation. The important data words in this message are the modes 508 and barometric altitude 509 words. The mode word contains information identifying the message type (interrogation, response), directives (leader is in escape sequence, follower should abort tracking, etc.), error codes (leader has loss of carrier, leader has loss of response, parity error in previous message, etc.), and formation codes (leader is in trailing wing formation, wing-to-wing formation, etc.). The barometric altitude is used by the follower to calculate the altitude displacement between itself and its leader. The range 517 and bearing 518 data words are, as mentioned previously, the range and bearing between the follower and the leader as measured by the leader during the last interrogation/response cycle. The follower uses the remaining data for predicting the movements of the master to provide a navigation prediction input into the ADFCS.

Figure 6:
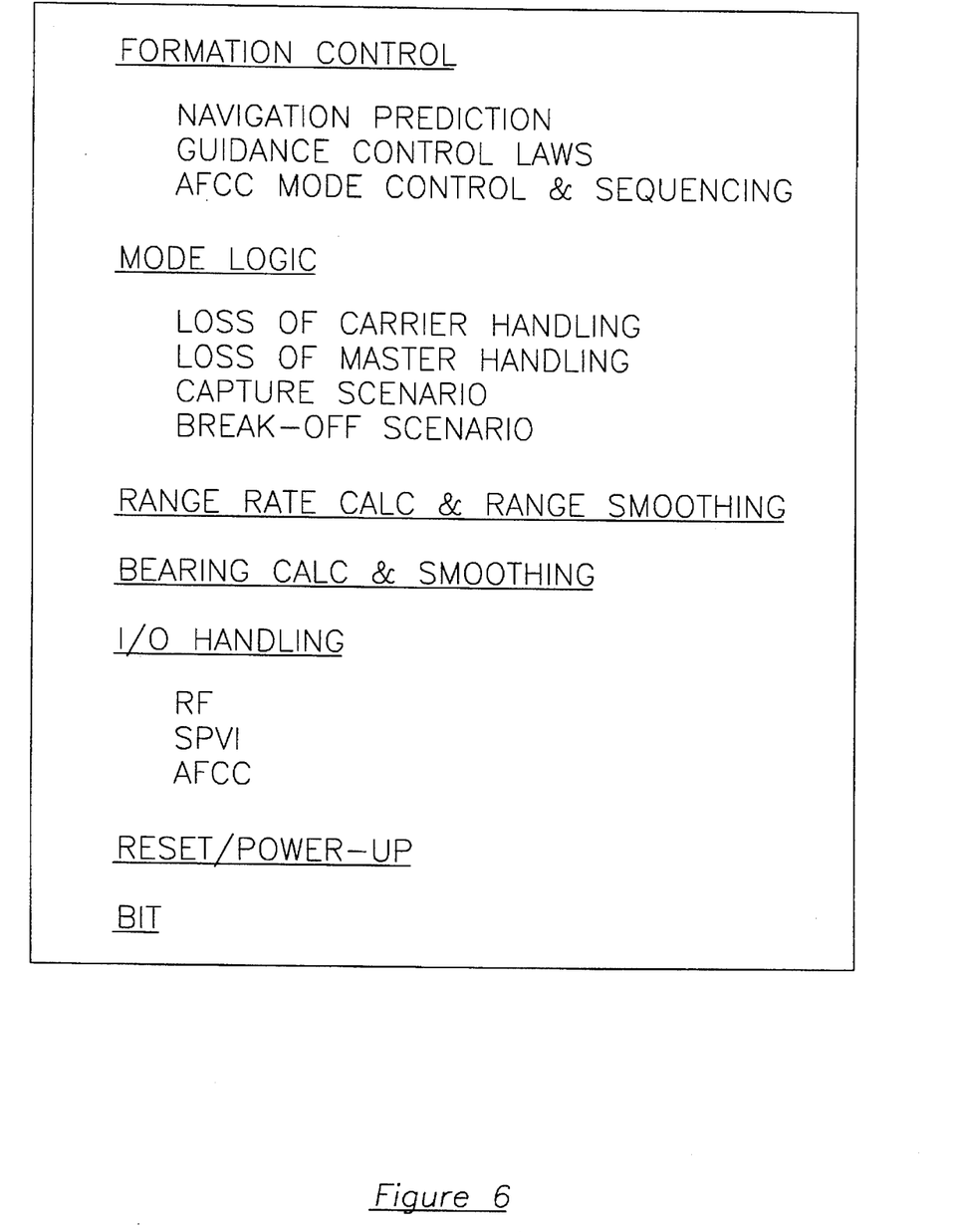
FIG. 6 illustrates the formation control software modules.

Software modules which the FCP processor 205 utilizes are shown in tabular form in FIG. 6. The formation control modules include navigation prediction, guidance control, and AFCC mode control.

Figure 7:
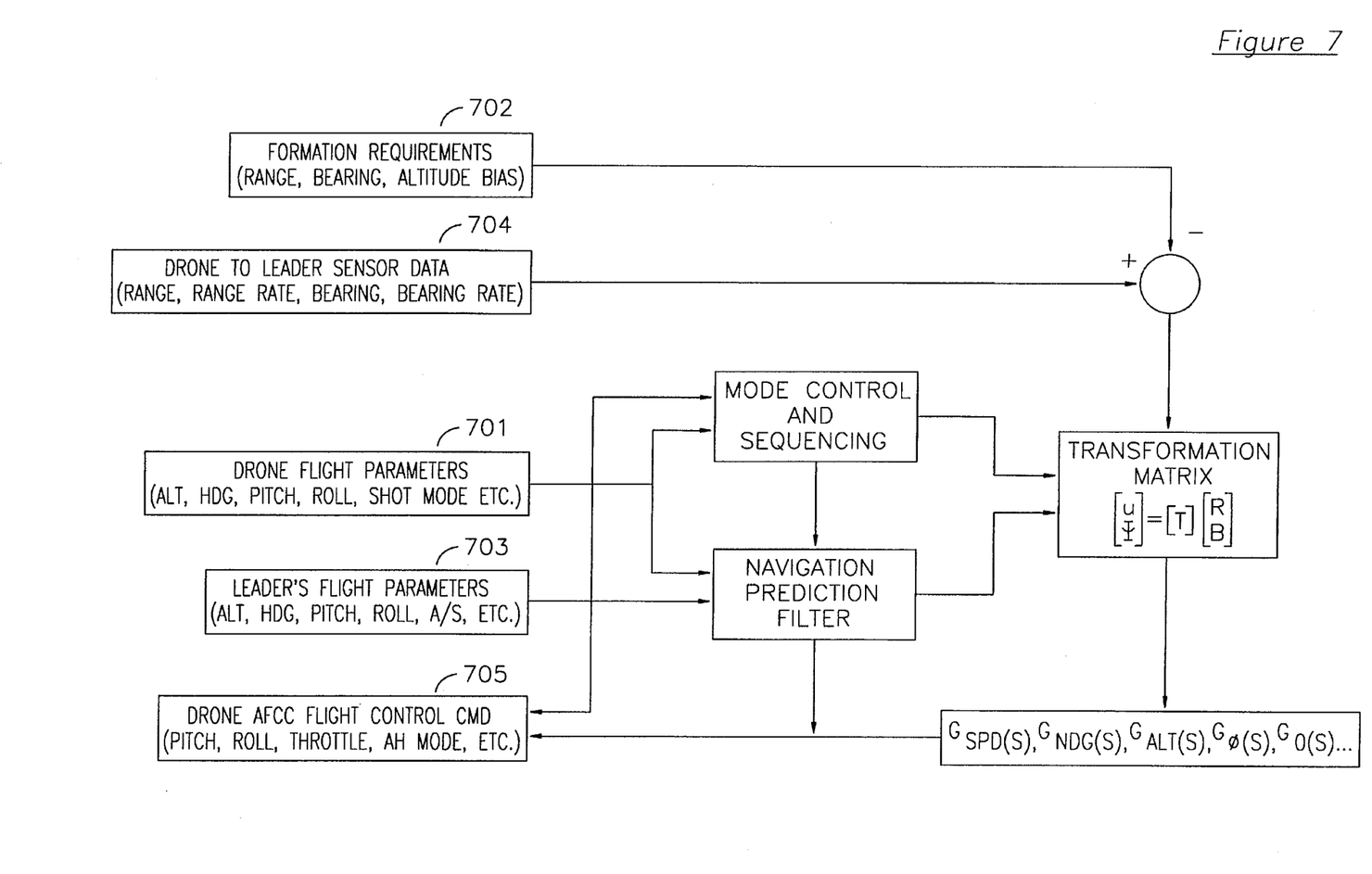
FIG. 7 is a block diagram of the formation control software.

A simplified block diagram of the formation control software is shown in FIG. 7. The major inputs to the guidance control laws are measured parameters 701 and desired (commanded) range, bearing, and altitude displacement differentials 702, combined with predictions 703 of the leader's flight path and the attitudes, rates, airspeed, etc., 704 of the follower drone itself. Pitch, roll, throttle, and appropriate mode controls 705 (speed hold on throttle, altitude hold on pitch, etc.) are outputs to the AFCC for controlling the drone's flight. Turning back to FIG. 5, the mode logic modules handle emergency modes and capture and break-off procedures. Other modules include measured data filtering and smoothing, I/O handling, reset and power-up procedures, and built-in test (BIT).

In the ADOPT protocol, two specific time constants are to be satisfied before a data transfer can begin. The first time constant is a fixed time count, T, which is dependent upon the predetermined maximum number of drones in the formation and the predetermined data frame format of FIG. 5. The actual value of T is identical for all drones in the formation. The second time constant is a fixed time count, t, the value of which is unique for each drone in the formation. Both t and T must be satisfied for a drone before that drone may initiate transmission in a data frame.

A drone's T count is set upon power-up and reset upon that drone's initiation of a data frame. The T count is suspended during any detection of data on the transmission medium. A drone also flags its count T as set if its initialization of data in a frame is detected to be invalid (corrupted data).

A drone's t count is reset upon power-up or upon data detection.

The fixed time T ensures that all drones in the network have an opportunity to access the medium. Therefore, T must have a duration at least as long as the sum of all unique t constant plus all delay intervals between data pieces (messages) for all data frames. The duration of each message is ignored since the T count is held during data detection.

The unique time t prevents drones, whose T counts have expired, from initiating their data frames simultaneously during the next free space (no data detected on the transmission medium). All t counts are long enough to distinguish them from one another and from inter-message delays.

Since T includes all t counts and inter-message delays, once a drone has accessed the transmission medium that drone's data frames become periodic, resulting in a fixed data update period Tu. The worst case Tu is then the sum of the time duration T and all message durations for one complete transmission cycle for all the drones.

Given the definitions of T, t, and Tu, the following mathematical representations can be derived:

Where
Tu=data update period for each drone
T=fixed time constant common to all drones
t=fixed time constant unique to each drone
N=maximum number of interrogators in formation
M=maximum number of messages per data frame
i=drone identification number
tm=message time duration
td=inter-message time delay
Then $$T = \Sigma t i + N(M-1) t d$$

$$Tu = T + NM t m$$

The echelon drone formation as shown in FIG. 1 is helpful for purposes of explaining the protocol arrangement. The formation includes drones 101, 102, 103, 104, 105 and 106. Drone 101 is chosen as the leader of the formation and drones 102 and 103 follow the drone 101. Similarly, drone 103 acts as a leader for drone 105 and so on. Thus it is the responsibility of each of the drones to track and follow its known leader drone. Thus, in contrast to other master/slave approaches, it is not the responsibility to command a slave drone to perform certain maneuvers. Instead it is the follower or slave drone's responsibility to interrogate its master or leader drone and to follow the leader. A leader drone, such as drone 103 is to drone 105, has a responsibility to interrogate its leader or master drone, in this case drone 103 interrogates drone 101. Drone 101, as the leader drone for the formation, follows the commands of the ground station 110. Each drone has the responsibility to find its leader by interrogating, evaluating the response from the leader and, combined with a measured azimuth and a measured range, to perform the necessary maneuvers.

Figure 8A:
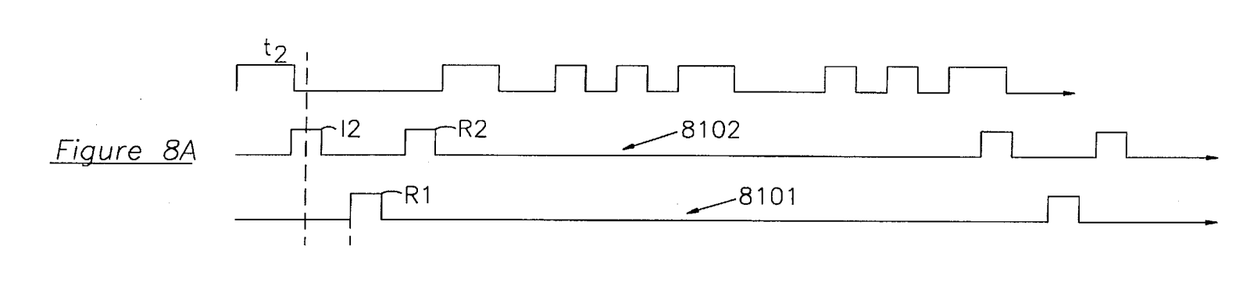
FIGS. 8A, 8B, and 8C are timing diagrams for the transmission cycle and timing for a three drone formation.
Figure 8B:
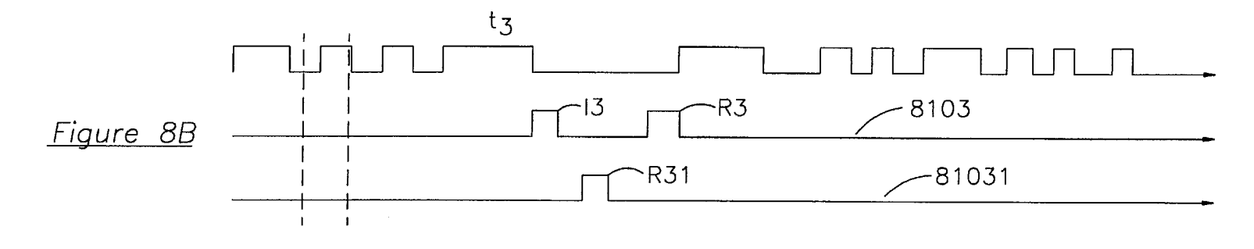
Figure 8C:
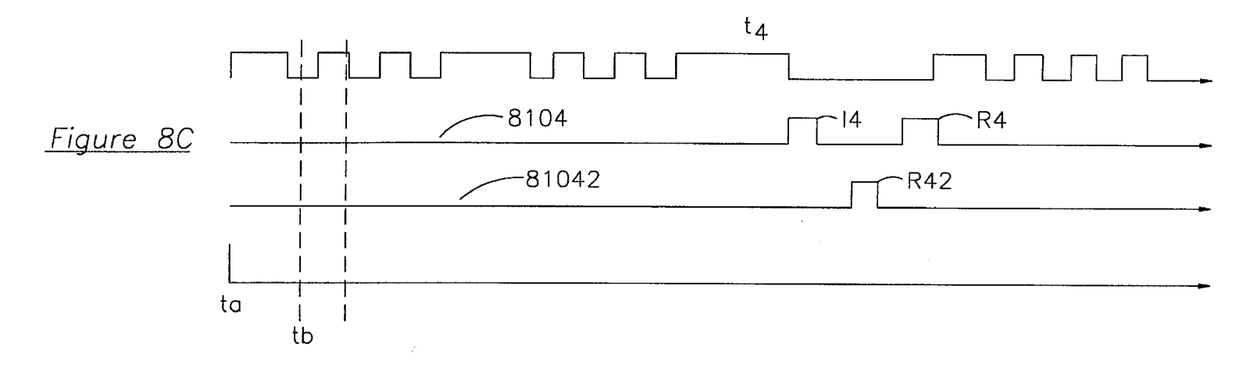

FIGS. 8A, 8B, and 8C illustrate the transmission cycle and timing for the four drone formation consisting of drones 101, 102, 103 and 104 of FIG. 1 whose t counts are, respectively, t1=td, t2=2td, t3=3td, and t4=4td. The data frame format is such that an initiating drone sends data to another drone which in turn sends data back and then receives another data piece. Any data frame structure may be formulated as long as M, rs, and td are known to set the appropriate T and t constants for maintaining the protocol. In this example, T=15td and Tu=(15td+9tm).

FIG. 8A illustrates the communication exchange between drone 102 and drone 101. The transmit waveform for drone 102 is shown as waveform 8102 and the transmit waveform for drone 101 is shown as waveform 8101. During time slot I2, drone 102 transmits interrogation information to drone 101. During time slot R1, drone 101 responds with parameter information transmitted to drone 102. Drone 102 will acknowledge receipt of the information from drone 101 during time slot R2. Similarly, FIG. 8B shows timing waveforms for communication between drone 103 and drone 1. The timing waveform for drone 103 is illustrated as waveform 8103 and the timing waveform for drone 101 for this purpose is illustrated as waveform 81031. During time slot I3, drone 103 transmits interrogation information to drone 101. Drone 101 responds during time slot R31 and drone 103 transmits acknowledgement during time slot R3. Likewise, the transmission between drones 104 and 102 are shown in waveforms 8104 and 81042, respectively. During time slot I4, drone 104 transmits to drone 102. Drone 102 responds during time slot R42 and drone 104 acknowledges receipt in time slot R4. For purposes of clarity, the time Ta shown in FIGS. 8A through 8C is simultaneous powerup for all units. At time tb, data is detected as a result of drone 102 transmitting during time slot I2. At this time, t is reset for all drones.

Figure 9A:
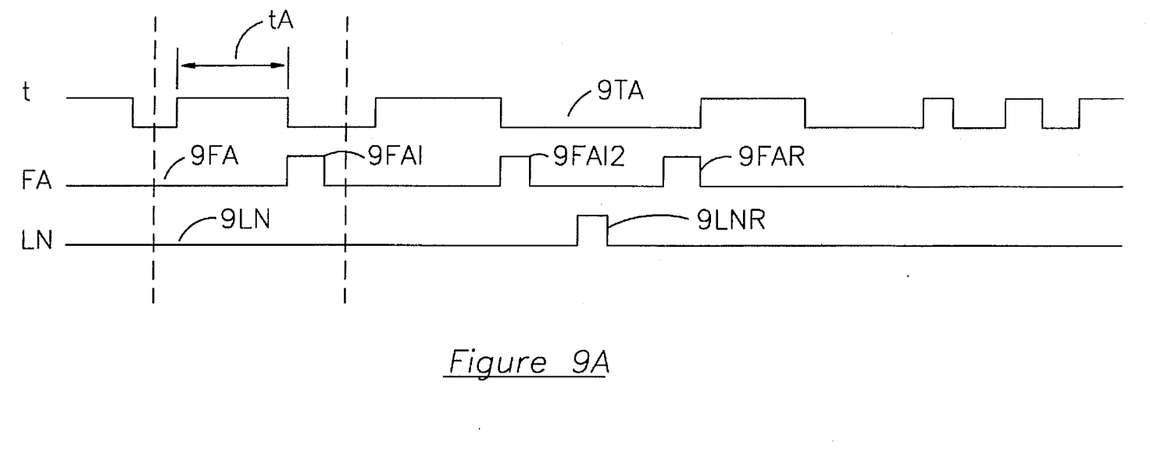
FIGS. 9A and 9B illustrate the timing when data collision occurs.
Figure 9B:
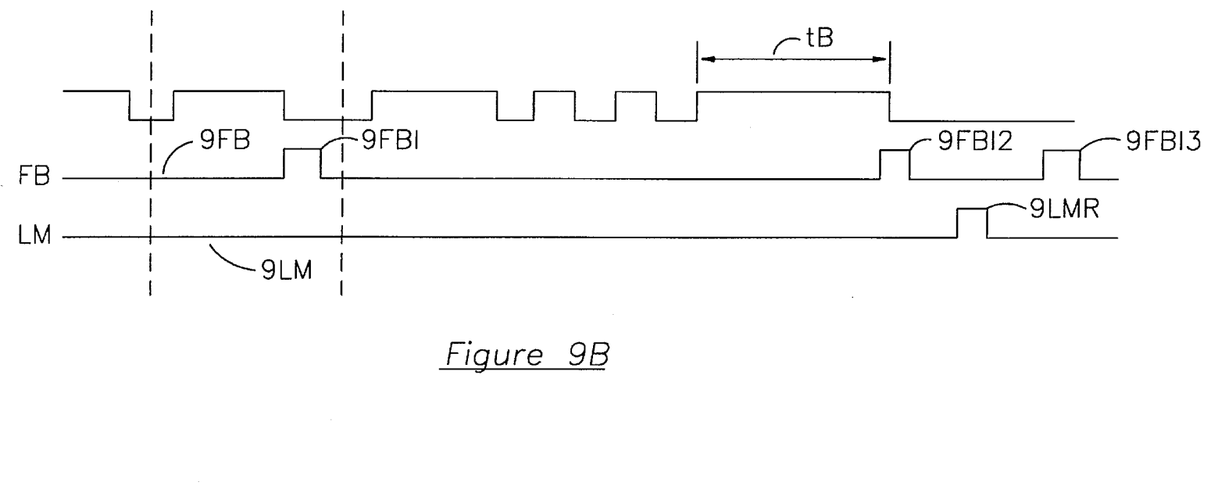

It is possible for a data collision to occur when a drone detects a power-up condition and the timing is such that its t count expires simultaneously with another drone's t count. In this instance, both drones' t counts will be flagged as complete and their t counters will be reset (data detected), causing the drone with the shorter t to transmit next. FIG. 9 depicts this scenario where no response is received from the desired drone. This is treated as a data collision detection.

FIGS. 9A and 9B indicate what happens when a data collision occurs. FIG. 9A shows the waveform for a follower drone FA communicating with its leader drone LN. FIG. 9B shows the waveforms for the timing of communications between a second follower drone FB communicating with its leader drone LM. At time $t_a$, follower drone FA detects powerup and begins counting its t count ($t_a$). At this time, the drone Fb is already in its counting phase for t ($t_b$). Both T counts have expired such that the interrogation time slots for FA and FB occur simultaneously at time $t_b$. As can be seen by comparing FIGS. 9A and 9B, time slot 9FAI of waveform FA occurs at the same time as time slot 9FBI occurs in waveform FB. A collision has thus occurred. After a time period tA, an interrogation time slot 9FAI2 occurs in the waveform FA. The corresponding leader drone LN responds during time slot 9LNR which is in turn acknowledged during time slot 9FAR. As can also be seen from the follower drone timing waveform FB, a new interrogation occurs during time slot 9FBI2 which is responded to during time slot 9LMR of waveform 9LM. That in turn is responded to during time slot 9FBI3 in the waveform FB.

As described above and depicted in FIGS. 8A, 8B, and 8C, Tu is constant for all drones in a stable network. However, if drones drop off or new drones come on line, the network becomes temporarily unstable. After all active drones have accessed the medium and have drifted (due to hardware timing differences) into their time slots, the network is again stable but with a different Tu. When a drone is dropped off, Tu will decrease due to the dropped drone's data frame, the data throughput in the network increases and, thus, the period Tu is said to be optimized. In the example described, if drone 103 is dropped, T still equals 15td while Tu is now (15td+6tm).

The protocol has the advantage over controller-based protocols, such as that in MIL-STD 1553, in that it does not require a highly reliable controller, nor the capability for other or all drones in the network to assume control in case of a controller failure.

This invention has been described herein in considerable detail in order to comply with the Patent Statutes and to provide those skilled in the art with the information needed to apply the novel principles and to construct and use such specialized components as are required. However, it is to be understood that the invention is not restricted to the particular embodiment that has been described and illustrated, but can be carried out by specifically different equipment and devices, and that various modifications, both as to the equipment details and operating procedures, can be accomplished without departing from the scope of the invention itself.

The embodiments of the invention in which an exclusive property or right is claimed are defined as follows:

1. A drone control system comprising:

a plurality of drones, wherein each drone includes:

an antenna apparatus for receiving and transmitting command and telemetry information;

an automatic flight control computer;

a decoder/encoder means for detecting received command information pertaining to drone formation; and a formation control processor which receives and transmits flight information through said antenna apparatus and provides the flight information to the automatic flight control computer; and a remote controlling means which transmits flight control information to a first drone in said plurality of drones such that the first drone's movements are controlled, said first drone establishes a leader-follower relationship with at least one other drone in the plurality of drones where the at least one other drone interrogates the first drone as to its movement parameters and automatically follows the first drone, the leader-follower relationship is established amongst all the drones in the plurality of drones other than the first drone such that the plurality of drones flies in a predetermined formation with the first drone being the only drone under control of said remote controlling means.

2. A drone control system in accordance with claim 1 wherein:

said first drone receives the flight command information from a ground station, and said automatic flight control computer flies said first drone in accordance with said received flight command information.

3. A drone control system in accordance with claim 2, wherein:

said formation control processor of each of said drones includes memory containing said flight information.

4. The drone control system of claim 1 wherein each of the drones in the plurality of drones is equipped to replace the first drone.

5. A method of controlling the operation of a plurality of drones comprising the steps of:

selecting a first one of said plurality of drones to be a formation leader;

storing formation information in the remaining ones of said plurality of drones;

providing control information to said first drone whereby said first drone's movements are controlled; and operating each drone other than said first drone automatically such that each drone other than said first drone follows the movement of one other drone by interrogating said one other drone as to its movement parameters, said one other drone transmitting parameters in response to being interrogated, and said each drone operating in accordance with the parameters received to mimic the movement of said one other drone in accordance with the formation information.

6. A method in accordance with claim 5, including the further step of:

operating each drone other than said first drone such that if said each drone does not receive said movement parameters from its corresponding said one other drone, a second other drone is automatically selected in accordance with predetermined selection criteria.

7. A method in accordance with claim 5 wherein:

said interrogating and transmitting is performed in accordance with a communications protocol, said communications protocol being selected such that data collision does not occur.

* * * * *